United States Patent [19]

Smith et al.

[11] Patent Number: 5,630,103
[45] Date of Patent: May 13, 1997

[54] RADIO TRANSMISSION SYSTEM FOR DISTRIBUTION OF NEWSPAPER COPY IN COMPUTER FORMAT TO PERSONAL COMPUTERS FOR VIEWING

[76] Inventors: Patrick C. Smith, 107 Morningside Dr.; Joel B. Aud, 1763 Stoopto Rd.; William D. Cotten, 208 Lake Rd., all of Sylvania, Ga. 30467

[21] Appl. No.: 407,300

[22] Filed: Mar. 20, 1995

[51] Int. Cl.[6] ............................. G06F 9/00; G06F 9/455
[52] U.S. Cl. ........................ 395/500; 364/DIG. 2; 364/919; 364/919.2
[58] Field of Search .................. 395/500; 364/900, 364/413.02, 900 MS File; 370/124; 380/9, 49; 455/45; 329/304; 332/103

[56] References Cited

U.S. PATENT DOCUMENTS

| | | | |
|---|---|---|---|
| 4,646,290 | 2/1987 | Hills | 370/84 |
| 4,740,912 | 4/1988 | Whitaker | 364/900 |
| 4,937,821 | 6/1990 | Boulton | 370/124 |
| 5,023,934 | 6/1991 | Wheeless | 455/45 |
| 5,070,404 | 12/1991 | Bullock et al. | 358/142 |
| 5,208,855 | 5/1993 | Marian | 380/9 |
| 5,214,792 | 5/1993 | Alwadish | 455/45 |
| 5,416,695 | 5/1995 | Stutman et al. | 364/413.02 |
| 5,436,591 | 7/1995 | Henze | 329/304 |
| 5,473,290 | 12/1995 | Scomazzon et al. | 332/103 |
| 5,506,902 | 4/1996 | Kubota | 380/9 |
| 5,519,780 | 5/1996 | Woo et al. | 380/49 |

*Primary Examiner*—Kevin J. Teska
*Assistant Examiner*—Russell W. Frejd
*Attorney, Agent, or Firm*—Laurence R. Brown

[57] ABSTRACT

An electronic method for distributing printed media to subscriber stations for viewing on a personal computer and corresponding electronic distribution system is afforded by this invention. Mass distribution of newspaper or periodical magazine copy is made feasible by converting the copy into an electronic data flow stream format with sequentially represented computer files identified for reception, selection and extraction at a subscriber's computer system. This data stream then is transmitted en masse in this format over a narrow bandwidth transmission channel without filtering or logical processing for local area broadcast over a commercial FM broadcast station on a subcarrier frequency. There selected files are extracted at subscriber reception stations from the data flow stream and stored for interactive manipulation and viewing either as printed media or as an image on a PC viewing monitor.

25 Claims, 7 Drawing Sheets

RADIO TRANSMISSION SYSTEM FOR DISTRIBUTION OF NEWSPAPER COPY IN COMPUTER FORMAT TO PERSONAL COMPUTERS FOR VIEWING

TECHNICAL FIELD

This invention relates to mass electronic transmission of media copy, such as newspaper or magazine copy, to a multiplicity of personal computers at receiving stations in selected cities or towns for viewing, and more particularly it relates to organization of media copy in a data flow stream for transmission on a subcarrier of a local FM radio station for reception, storage and computer processing by the receiving personal computer.

BACKGROUND ART

The printed media arts, such as newspapers and magazines, have developed rapid electronic distribution systems for providing time-sensitive newspaper copy to remotely located towns and cities for printing and local distribution to subscribers. Thus, electronic mass transmission of the media copy has been formatted for use in printing plants using conventional printing presses and requiring local distribution by convention carriers. In these distribution systems, updated news copy is available at best in early and late newspaper editions, without the possibility of distributing extra editions to subscribers at the time news breaks become available.

Any attempts at direct publisher to subscriber electronic communications have been costly and limited in scope because of the necessity to allot wide band radio transmission channels and dedicated telephone lines for point-to-point connections in electronic distribution systems. Furthermore such electronic systems require complex equipment for monitoring and distribution of the data. In the case of point-to-point facsimile systems, dedicated communication lines are required to avoid the problems encountered with overloaded connections and busy lines when communications are simultaneously required to many distribution points through the telephone switching systems. Furthermore the accompanying telephone charges are costly and uncontrollable by the media source. Accordingly prior art mass communication systems are complicated by the requirement to store mass data and to establish point-to-point communications in a transmission phase for reaching large numbers of individual subscribers.

Similarly computer networks, such as "Internet", provide for point-to-point connections between sending and receiving stations over dedicated connection lines. These are not suitable for processing such mass audiences as newspaper subscribers. Furthermore they require such extensive charges, protocol and formatting requirements for massive data transmissions that it is not feasible to provide a simple low-cost newspaper delivery system. Therefore presently conceived computer networks are not feasible for distribution of the daily newspaper, requiring masses of data to instantaneously reach a myriad of separate computerized reception points. The computer network facilities cannot process such data mass traffic requirements to so many subscribers without becoming jammed in the same way that commercial telephone switching networks are tied up during heavy traffic conditions.

Accordingly it is a primary objective of this invention to provide an instantaneously accessible low-cost mass-communication electronic system for transmission of masses of printed media copy simultaneously to large numbers of subscribers from a media source for subscriber viewing at various geographical locations.

Radio transmission of printed and video media data over subcarriers of FM radio broadcast stations to end users has been proposed in U.S. Pat. Nos. 4,646,290, Feb. 24, 1987, to M. T. Hills; 5,023,934, Jun. 11, 1991 to J. Wheeless and 5,070,404, Dec. 3, 1991 to W. J. Bullock, et al. However these systems are not satisfactory for error free transmissions and require complex signal translations into and out of various codes with the possibility of error, and the resulting higher cost of data manipulation. Expensive auxiliary specialized equipment is required, which is not readily commercially available or useful for other purposes at the reception station. Thus, these prior art systems are not suitable for distribution of newspapers, but there is merit in the general method of local distribution of mass data to reach large numbers of end users over a subcarrier of an FM broadcast radio station.

These prior art systems are not capable of transmission of data that is coded and transmitted in a format directly used in a personal computer at the reception station, for example. Nor are they capable of satisfactory error correction techniques for eliminating any errors that may be introduced in the radio transmission phase. A particular problem is presented in this respect in a one-way transmission system without feedback to the transmitting source.

Accordingly it is an accompanying objective of the invention to provide a simplified inexpensive mass data communication system to broadcast massive data for reproducing newspapers including pictures. Another objective is to avoid complex encoding-recoding steps by transmission of the newspaper copy in a format which can be directly processed by standard commercial computers without code conversion.

A still further objective is to provide a one-way transmission system in which errors introduced in the transmission phase may be detected and eliminated.

Furthermore a primary objective is to produce a significantly improved newspaper distribution system.

In the distribution system for a newspaper or other periodical type of printed media many costly and time consuming steps have conventionally been required in the prior art. For example, conventionally the papers are printed at a central city site for manual carrier distribution to subscribers throughout the city. This introduces distribution problems, high cost, time delays and waste occurred in overprinting.

Furthermore the cost and waste of newsprint is a significant social problem incurred because of the temporary life value nature of newspapers resulting in high newsprint cost, environmental pollution, loss of forestation and complex disposal procedures. Because of the comprehensive subject matter in the newspapers for reaching the combined needs of a large subscribing audience also there is a great waste of resources in that few subscribers are interested in the entire newspaper and immediately discard significant portions as surplus. There is no known present newspaper delivery system that affords the subscriber the opportunity to select only those portions of the entire newspaper that are of personal significance.

There has not yet been introduced a viable and operable newspaper distribution system reaching the subscribers directly for viewing by each subscriber without printing on newsprint, nor of any practical way to avoid the newspaper distribution wastes caused by the conventional system of distribution.

Accordingly it is a further objective of this invention to provide a practical, low waste, low cost and substantially instantaneous electronic newspaper distribution system. Thus, the subscriber's personally selected newspaper files may be stored electronically in a subscriber's computer system for viewing and disposal, thereby avoiding the conventional wastes of newsprint.

Other objects, features and advantages of the invention will be found throughout the appended drawings, the following description and the claims.

DISCLOSURE OF THE INVENTION

An electronic mass data transfer system from a central data source of printed media simultaneously to a myriad of personal computers of subscribers located in remote town or city localities is provided by this invention, which is particularly adapted for improving the distribution of newspapers.

Mass distribution of newspaper or magazine copy is made feasible by converting the copy into an electronic data stream format of computer files identified for selection and extraction at a subscriber's personal computer terminal. This data stream is compiled, whenever the news is edited and formatted at the news source, into labelled computer data file format ready for broadcasting over local radio stations for direct entry into a recipient's personal computer system. Thus without any distribution delays the newspaper text is transmitted instantaneously en masse over a narrow bandwidth transmission channel constituting a modulated radio subcarrier of a commercial local station. The data is formatted for reception directly by the receiving personal computer system without filtering, code conversion, or logical processing. Typically, the broadcast medium is a subcarrier frequency of a local FM broadcast station available to newspaper readers within the broadcast range. A local radio receiver unit converts and stores selected data blocks in the massive data flow stream representing a newspaper directly into the newspaper reader's computer files automatically for viewing at the reader's pleasure either on a visual monitor or in printed form.

The reader may select those data blocks for establishing corresponding computer files of personal interest to the reader which are identified in the transmission, such as news, sports and comics. Thus, files are extracted from a comprehensive data flow stream and stored electronically by the reader's computer system.

The newspaper distribution system afforded by this invention departs from the conventional electronic newspaper distribution systems in that it provides for the conversion of electronically organized printed media computer copy into the reader's visible medium at the reader's personal computer system without requiring a local newspaper printing press plant. The electronic mass data radio transmission system of this invention makes the newspaper copy available locally in selected cities or towns to replace local printing presses and delivery networks now used for delivery of newspapers. In particular, the distribution system can provide immediate delivery in rural areas, which heretofore could not be economically done via manual delivery.

The distribution costs thus become relatively nominal in view of the novel data transmission system of this invention, which substantially instantly transmits the printable media copy, whenever it becomes available over a simplified radio transmission link in computer file format for automatic processing, storage and direct viewing upon a subscriber's personal computer monitor or printer at the reader's convenience.

This distribution system makes feasible simplified studio and media source processing equipment as well as low cost radio receivers at the subscriber's station for demodulating the data flow stream.

THE PREFERRED EMBODIMENT

Figure 1:
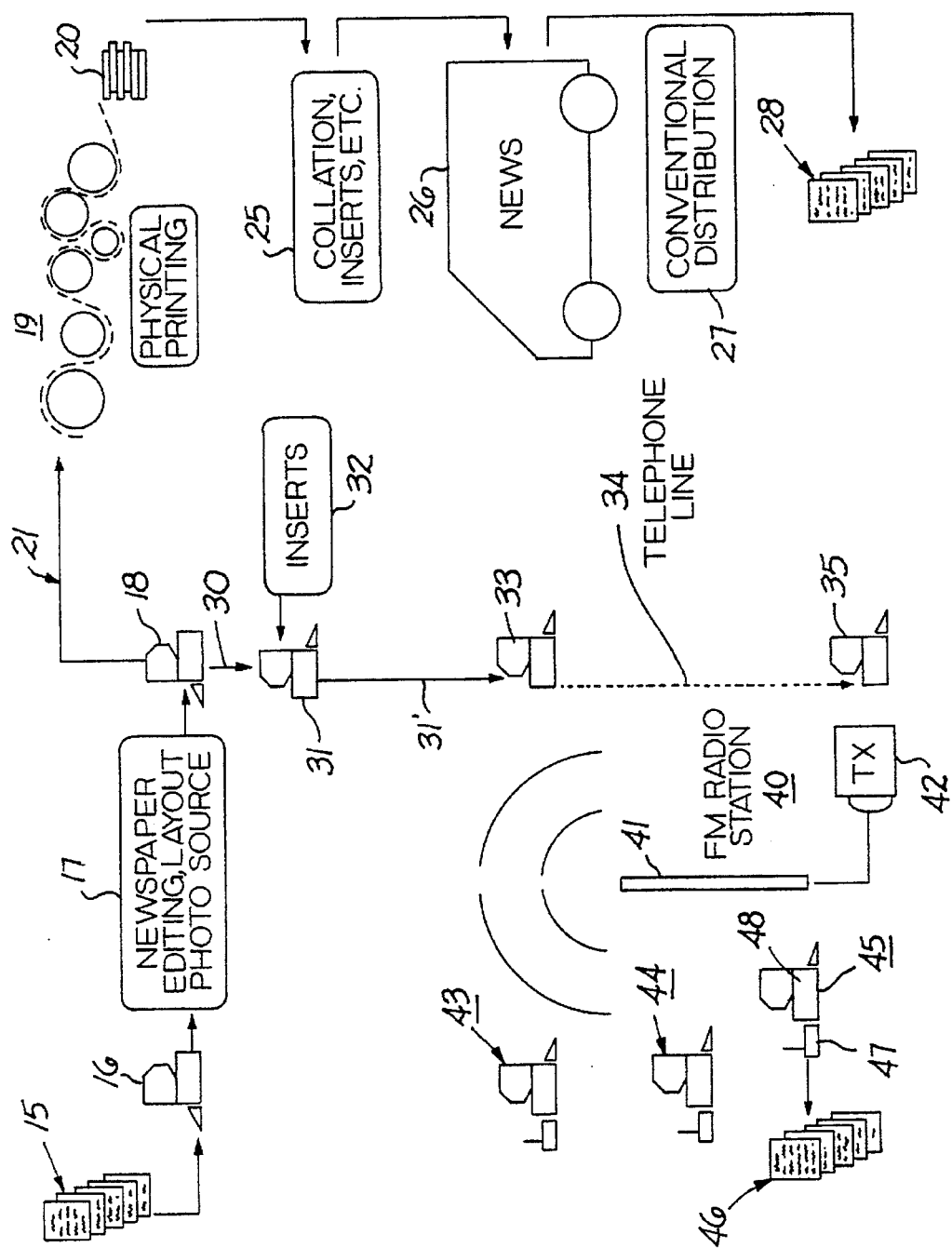
FIG. 1 is a block diagram sketch of a newspaper distribution system embodying the invention.
Figure 2:
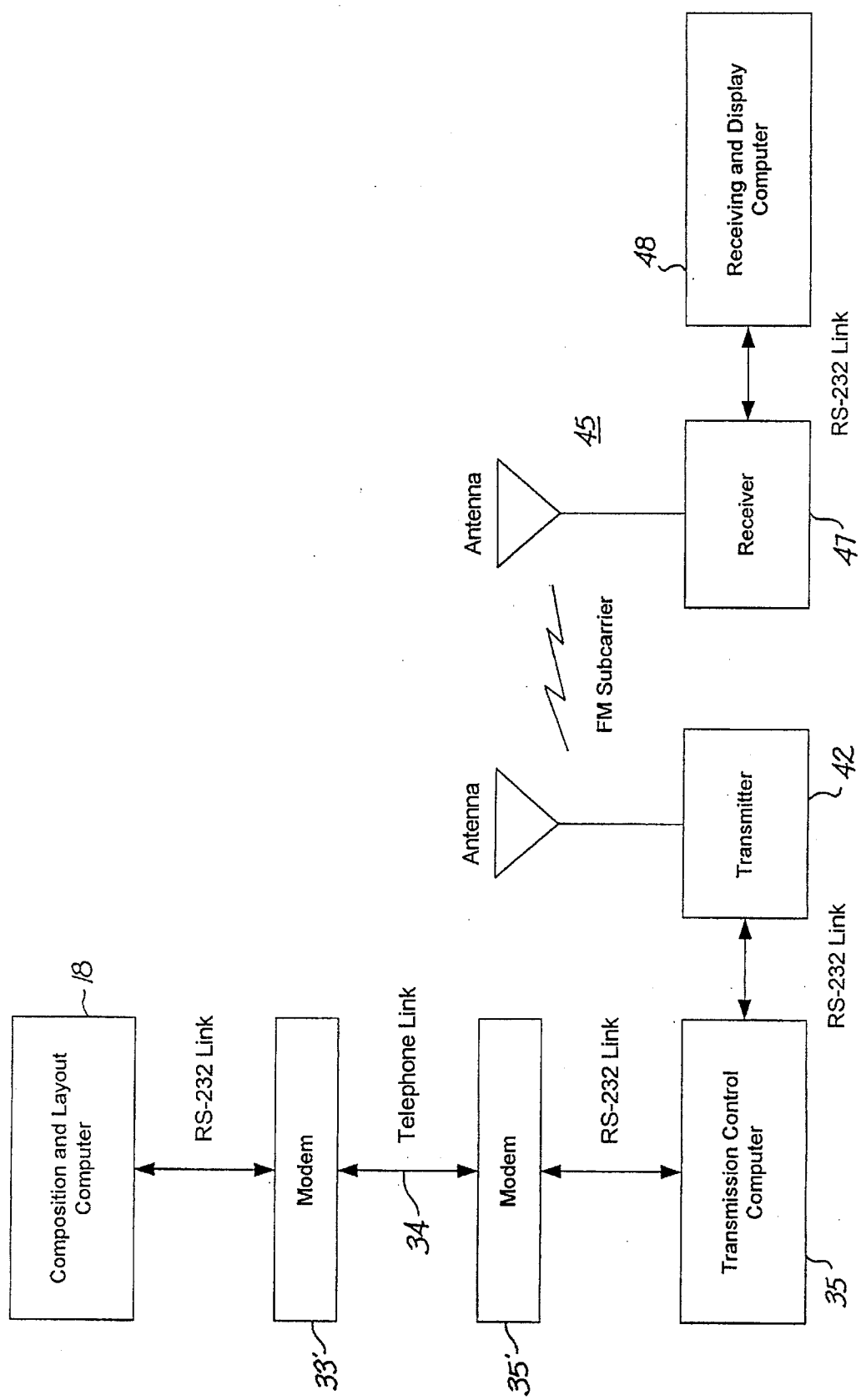
FIG. 2 is a simplified block system diagram of the electronic data communication system afforded by this invention.

As illustrated in FIG. 1, newspaper media copy 15 is conventionally processed at the newspaper office through computer 16 into computer file format. The computer 16 thus formulates the copy into edited computer code format where appropriate text and photos are layed out in media format. Each text article, advertisement and picture or other graphic is converted to a standard binary computer file, stored, and assigned a unique sequential number. The file is then entered into a set of database files employing a standard "xBase" format (hereinafter database). The database is used to describe such things as the content or subject of articles, the relationship between articles, the date of the paper the article appears in, and the display order of the advertisements. Also it mimics the physical layout of a printed newspaper by assigning articles or advertisements into appropriate page and section layouts.

Each file is also assigned a control code number, and that number is associated with the file name in a control file. This control code can be used by the receiving personal computer to selectively store or manipulate the components of the data stream based on such criteria as content, type of data, type of file, a profile established by the user of the receiving personal computer or combinations thereof. Then a control file is created listing all files to be transmitted (both database and data files) and the sequence in which they appear in that control file. The control file is also assigned a sequential number. The purpose of this sequential numbering is to allow the reception of multiple data streams by the same receiving personal computer without conflict.

A second control file is created listing all files to be broadcast in the sequence that they are to be transmitted. This allows one particular file or type of file to be repeated more frequently than another. All the database, data and control files are transferred to the processing personal computer 35 for addressing the subcarrier modulation system at a remote radio broadcast station 40, using modems 33, 35 and the public telephone system lines 34.

Further computer processing by computer 18 in the conventional systems translates the copy with proper control and identification coding for running in electronically actuated presses 19 to produce printed stacks of newspapers 20.

The transmission link 21 may be within a printing plant, a leased line to a cross-town printing plant, or a radio broadcast link to a printing plant in a remote city or town.

In the conventional newspaper distribution system, illustrated down the right hand column for comparison, the various pre-printed inserts and ads are collated into the printed papers in a suitable work station 25 before delivery in vans 26 to a conventional manual carrier distribution network 27. Thus the original copy 15 in reproduced newspaper format 28 reaches the subscriber.

In the present invention, the computer 18 codes the news media copy 15 directly for remote transmission into a data flow stream 30 which constitutes computer compatible files appropriately labelled with control and identification codes permitting automatic selection and storing into personal computer systems without further code conversions of the data flow stream format. The inserted ads, etc. are processed into the data flow stream as accompanying data blocks by computer 31 at station 32 to produce the modified data flow stream 30'. Conversely such inserts may be bundled for a separate broadcast cycle in the manner that Sunday editions often have an insert section that may be delivered on Saturday afternoon.

The computer-modem station 33 receiving and storing the data stream files electronically communicates the data flow stream over the telephone line 34 to a specified recipient computer-modem station 35 at a broadcast site. This broadcast computer 35 reproduces the stored data flow stream at the appropriate timing and speed for transmission on the subcarrier of an FM radio broadcast station 40 from the antenna 41 by way of transmitter 42. The data stream is then receivable by those subscriber stations 43, 44, 45, etc. within the broadcast range about the city, town or rural area.

The more detailed subscriber station representation 45 illustrates the procedure for reproducing visually the newspaper copy 15 being transmitted into the visible copy 46 reproduced from files extracted from the data flow stream received at the radio receiver unit 47 and stored in the computer 48 for reproduction upon a viewing screen or printer. Because the printed media data flow stream is divided into identifiable blocks constituting computer files, those portions of the original copy 15 that the subscriber wants may be selected for storage and viewing (46) in the subscriber's computer system 48, which has a corresponding local software for interactively selecting and storing those files of the subscriber's choice.

The computer linkage 16, 18, 33, 34, 35 simplifies the process of building the data structure which will be used by the receiving computer 48 to view and to manipulate the received data, and to simplify the process of delivering that data to the transmitting computer 35. This is the preferred embodiment but other systems for transferring the data mass can be employed for the newspaper delivery system. For example other databases could be used, or the computers 16, 18, 31 and 33 may be combined, etc. For local distribution in the vicinity of the news source, of course, the modem-telephone line linkage 33, 34, 35 is not necessary. When electronic transmission of newspaper copy to remote locations is in effect for printing newspapers in those localities, conversion into personal computer file compatibility could take place at the reception end. Also the term newspaper is used to comprehensively include equivalents such as periodically available magazines, catalogs, advertisements, schedules, stock market data and the like which may be delivered to subscribers.

Figure 3:
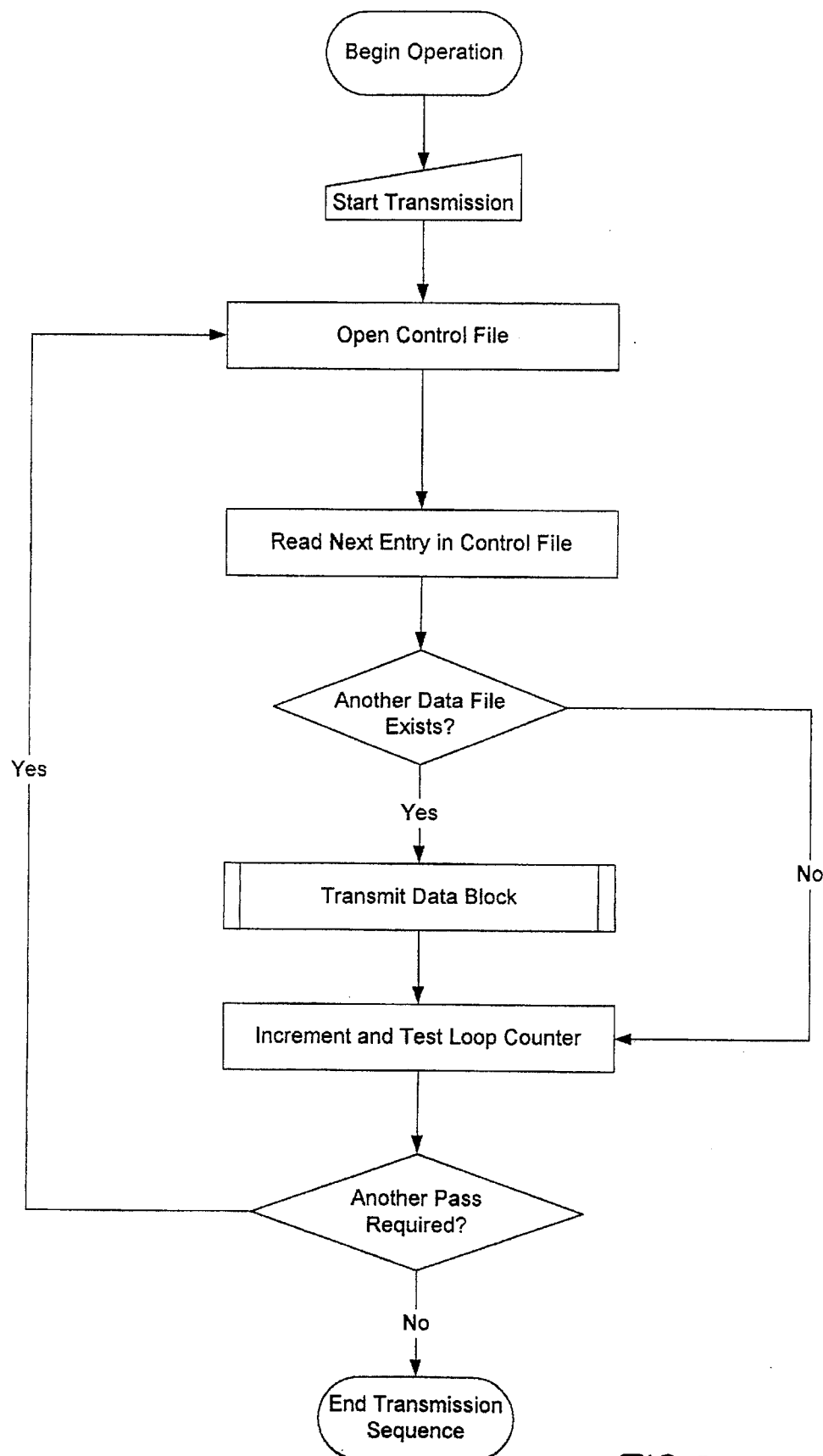
FIG. 3 is a computer program flow chart relating to the transmitter operation portion of the distribution system.

In the block distribution system diagram of FIG. 3, it is seen that the data flow stream preferably is processed in a format in conformance to the Electronics Industry Association RS-232 standard for serial connection input to personal computers, as is noted alongside the respective transmission links. In this preferred embodiment all controls are carried out on a suitable "IBM" PC or compatible personal computer using an "Intel 80386" chip or better provided with a "Microsoft Windows 3.1" or "Window NT" operating system. The transmission computer 35 thus begins reading the control file listing in order to broadcast the files contained in the data flow stream.

Figure 4:
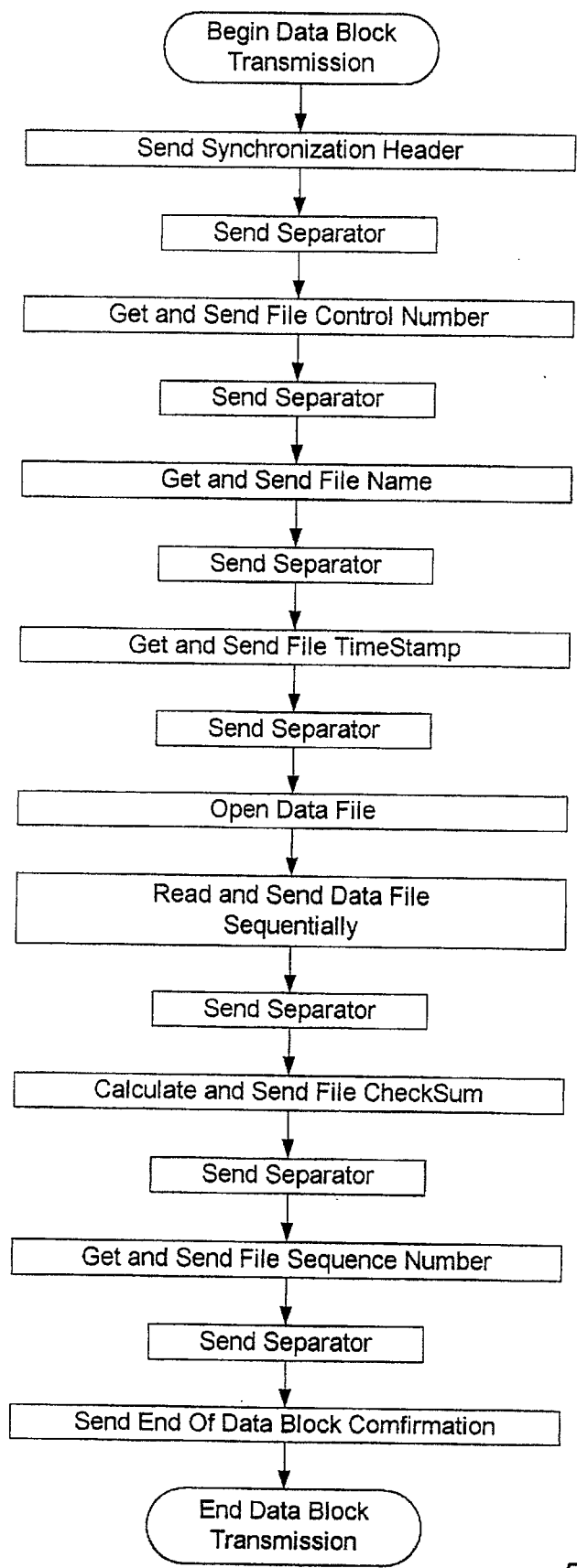
FIG. 4 is a computer program flow chart relating to the data block transmission portion of the distribution system.

The data flow chart of FIG. 4 illustrates the operation that the transmission computer 35 follows as it reads each file name for broadcast of that file at transmitter 42. Thus the data stream transmits specific information generated concerning that file. Specifically, the name of the file, the control number of the file, and the sequence number of the data file are determined. Also the size of the data file and the creation date from the computer operating system are determined. Additionally, a sixteen bit checksum for that file is generated, which is a mathematical representation of the contents of that file. All numeric values are converted to characters using ASCII code before transmission. The following table is an example of the format which may be used to transmit the data file plus the generated information concerning the file. This personal computer compatible file is termed a data block and a series of transmitted data blocks is termed a data flow stream.

TABLE

DATA BLOCK LAYOUT AND FORMAT

| | | |
|---|---|---|
| SYNCHRONIZATION SEQUENCE | | |
| | SEPARATOR SEQUENCE | |
| FILE | CONTROL NUMBER | Numeric |
| | SEPARATOR SEQUENCE | |
| FILE | NAME | |
| | SEPARATOR SEQUENCE | |
| FILE | DATE AND TIME | Date/Time |
| | SEPARATOR SEQUENCE | |
| FILE | LENGTH | Numeric |
| | SEPARATOR SEQUENCE | |
| FILE | CONTENTS | Length Varies |
| | SEPARATOR SEQUENCE | |
| FILE | CHECKSUM | Numeric |
| | SEPARATOR SEQUENCE | |
| FILE | SEQUENCE NUMBER | Numeric |
| | SEPARATOR SEQUENCE | |
| END OF DATA BLOCK VERIFICATION SEQUENCE | | |

First a unique synchronization sequence is sent to allow the receiving computer to find the start of the data block in the data stream. Then a separator sequence is sent followed by determination of and sending of a character string representing the control number for the file. This is followed by a separator sequence. Next a character string representing the control number for the file is determined and sent followed by a separator sequence. Then the name of the file is determined and sent, followed by a separator sequence. The timestamp of that file is then determined and a corresponding character string representing the date and time of the file is created and sent. This is followed by a file size character string and a separator sequence.

The data file is read sequentially and each byte of the file is sent followed by a separator sequence. The checksum is created and followed by a separator sequence and then the assigned sequence number for that file is determined and sent as a character string followed by a separator sequence. Finally an end of block (file) code is sent at the end of the data block. This procedure is followed for each entry in the transmission control file, and the entire data stream is sent either continuously until canceled, or as many times as the transmission computer 35 software requires.

Because the communications link is one way, there is no opportunity for the receiver 47 to control the flow of data from the transmitter 42. Thus the transmitting computer 35 pauses for a set time period after sending a set number of bytes to the transmitter 42. The duration and frequency of the time delays are determined empirically to accommodate the receiving computers 47 and may be adjusted to meet local conditions. Other alternative file formatting could be used optionally in the newspaper distribution system of this invention.

The data stream is sent to modulate a standard SCA (subcarrier) generator via serial connection to the FM radio broadcast station. Similarly the receiver 47 comprises a standard SCA receiver with an antenna designed for reception of the FM subcarrier. The modulated signal in computer file format is therefrom detected and serially connected through the RS-232 link to the viewing computer 48 in this preferred embodiment of the invention. Other optional system interfaces including parallel connections are well known in the art and may be employed optionally.

Figure 5:
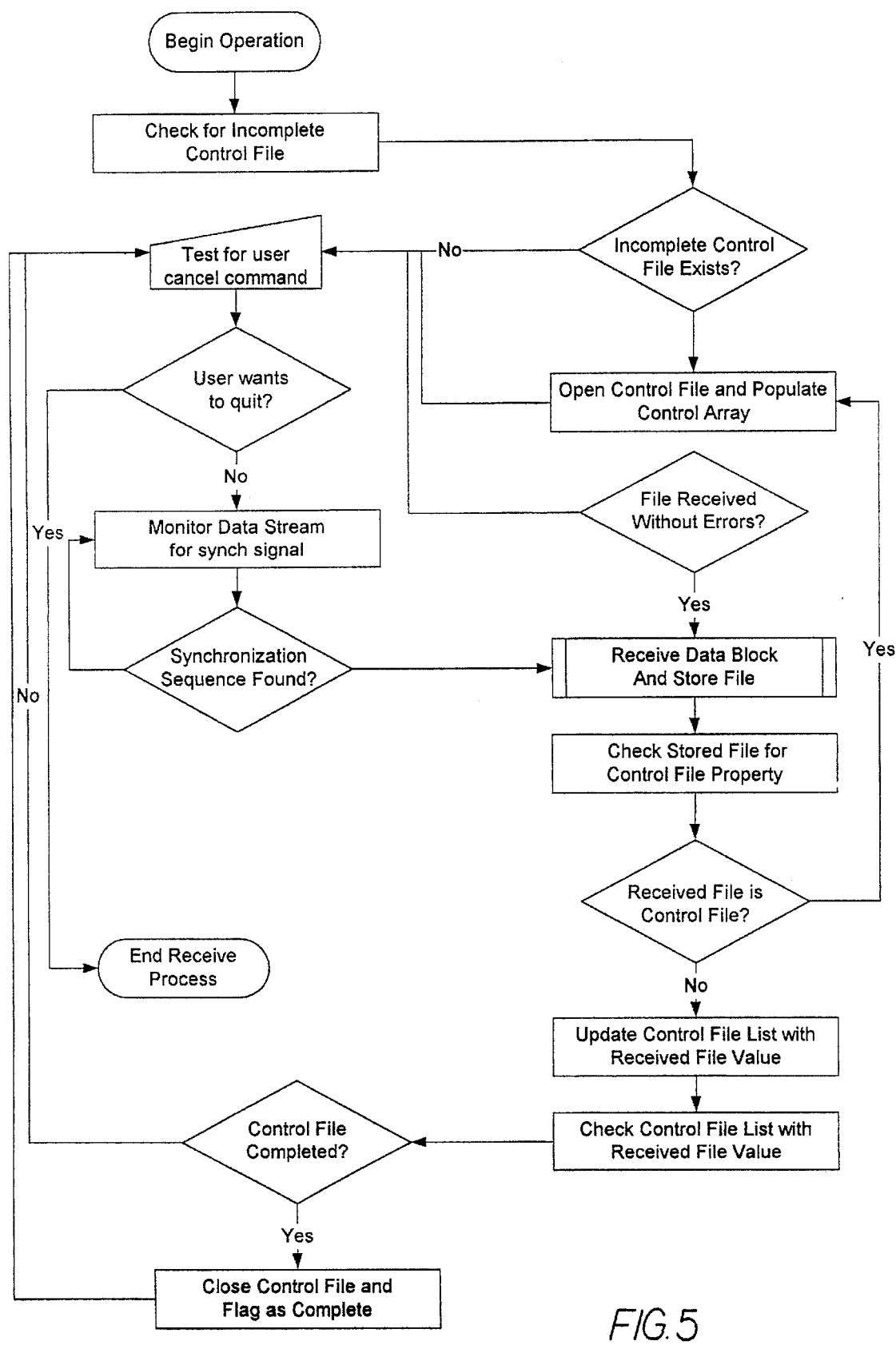
FIG. 5 is a computer program flow chart relating to operation of a radio receiver station in the distribution system.

FIG. 5 illustrates the operation of the receiving subscriber's computer 48. At the start, under direction of local software, the computer checks for the existence of a previously received receiver control file. If multiple receiver control files exist, the system selects the most recent control file and checks to see if all data files listed in that control file have been received. If not, it opens that file and populates a control array which indicates which data files listed in the control file have been received.

Figure 6A:
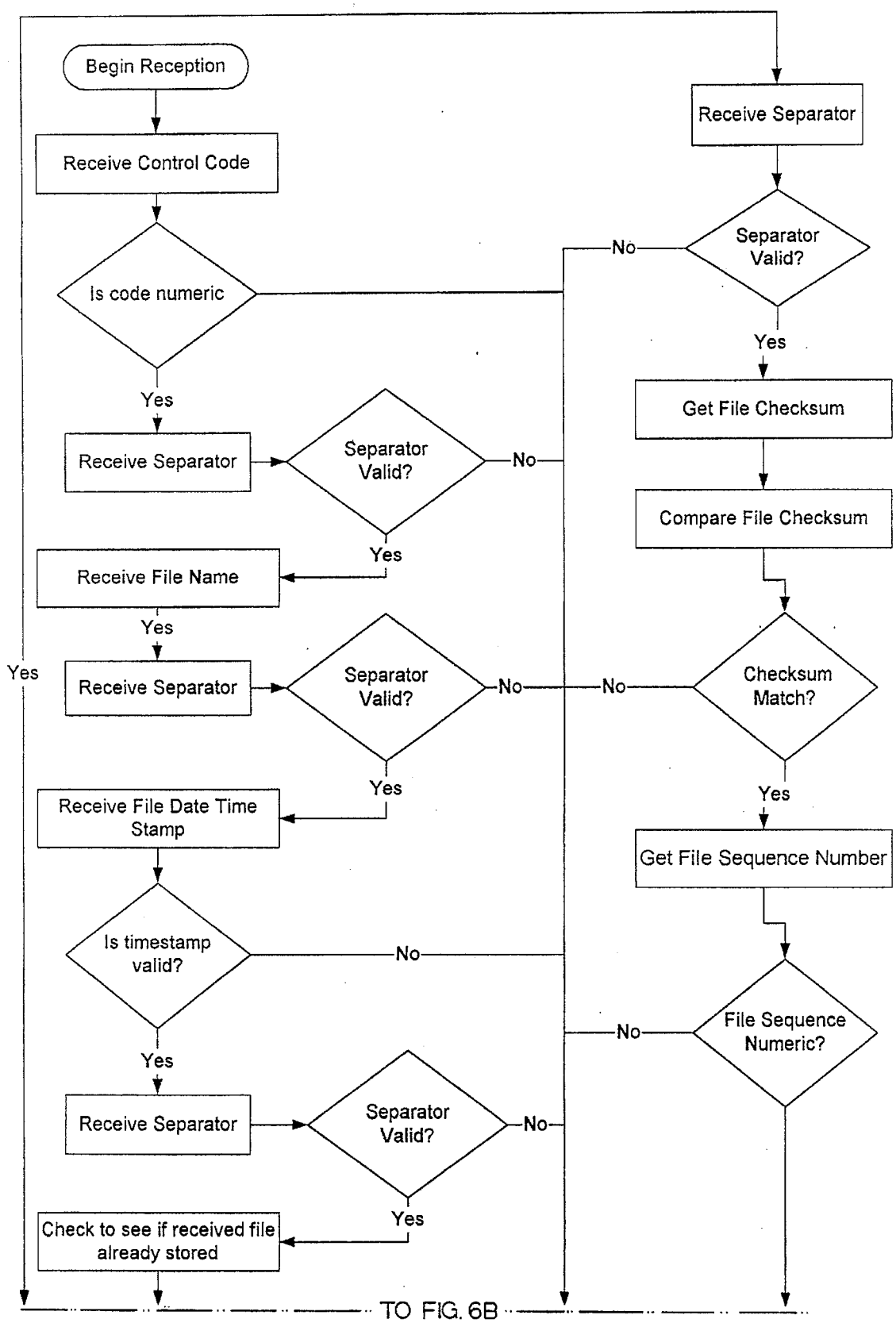
FIGS. 6A and 6B constitute a computer flow chart relating to the processing of data blocks sequenced in the data flow stream transmitted in accordance with this invention.
Figure 6B:
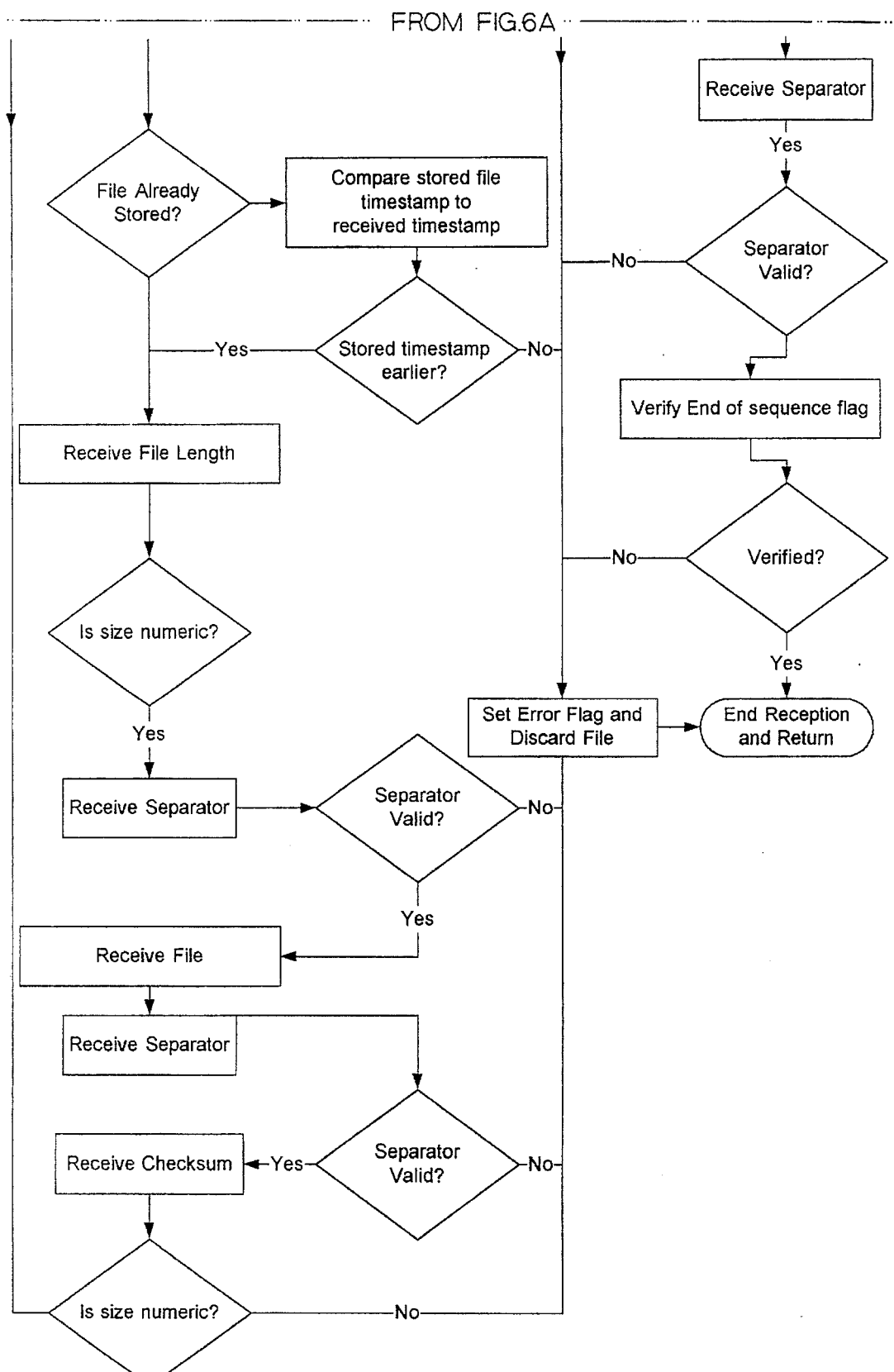

FIGS. 6A and 6B illustrate the process by which the data files are received. The receiving computer 48 monitors its connection to the FM subcarrier receiver 47 until it begins receiving the data stream. It then monitors the incoming data stream until it detects the synchronization sequence. Then it begins to decompose the data block into its component pieces.

The viewing computer 48 receives each control element by reading in all characters sequentially until it receives the separator sequence. In all cases, it counts the number of characters before the separator character. At a certain number of characters without a separator sequence, it abandons the attempt to receive that element.

On any data error, the receiving software abandons the reception attempt for that data block and returns to monitoring the repetitive data stream for the synchronization sequence. This automatically corrects for data errors caused by signal loss or interference.

The receiving computer 48 first receives the control number and checks that it is numeric. It then receives the name of the file and checks that the file has not already been received. It then receives the date and time that the file was created, and ensures the received timestamp represents a valid date. If not, a data error occurs.

If the file being received already exists, the receiving software compares the received date with the date of the file already stored on the receiving computer 48. If the stored file date is the same or later than the received file date, the stored file is not overwritten. The receiving computer then receives the file size and ensures that it is numeric and proceeds to receive each byte of the incoming file up to the received file length, storing them in a temporary file. It then checks the data stream to ensure that the next element is the separator sequence. If not, a data error occurs.

The receiving computer 48 then receives the checksum from the data stream, generates a checksum of the received file, and compares the two values. If they are not equal, a data error occurs and the temporary file is discarded. Next the name of the received file is checked to see if it conforms to a pattern for a control file. If it does, the old control file is closed. If it is open, the newly received temporary file is renamed, a control array is created and the list file of files received without a valid entry in the latest control file is checked for entries that occur in the newly received control file, and those invalid files are removed from the list file.

If the name does not conform to the pattern for a control file, the sequence number is received and is used to check the open control file for that data file. If no control file is opened, or if the received data file does not appear in the control file at the position indicated by the sequence number, the data file name and sequence number are written to a list file. If the control array is updated, it is checked to see if all elements in the associated control file have been received. If they have the control file is closed and it is marked as complete by being renamed. In either case if a date file is received and not discarded the operating system's date time stamp for that file is altered to be identical to the date time stamp received from the transmitter. This transmitted date time stamp is identical to the dated time stamp of the file on the transmitting computer 35.

This mechanism ensures the accurate synchronization of file versions on the transmit and receive sides of the apparatus. Finally the receiver checks the data stream to ensure that it receives the end of data block and synchronization sequences. If it does it restarts the receive process. Otherwise, it again begins monitoring the data stream for the synchronization sequence.

Because of the nature of the error checking performed on each data block and the structure of supporting information inserted into the data, the possibility of storing a data file containing errors is statistically insignificant. However because of the nature of unidirectional transmission, with data traffic over a medium that is prone to errors, such as FM radio transmission, some received data blocks will be rejected due to errors in the data stream. In order to achieve an acceptable reception rate, two methods are used. First, the entire data stream is repeated several times. Second, important data blocks (such as those transferring database files) may be repeated within a single data stream by modification of the transmission control file. The number of repetitions required to achieve adequate transferal of data will vary by size, and will need to be determined empirically.

In this preferred embodiment, a separate software package running on the receiver software is used to view, print, store or otherwise manipulate the received data. It should be noted that, on a computer employing a multitasking operating system, reception of data files can be done in the background while the computer performs other tasks. With the file scheme employing sequentially numbered data files and control files, multiple data streams can be received and sorted on the same receiving computer without interfering with each other. In a case where this is desirable, such as when newspapers from past days are stored, it is a requirement of the viewer software that it be able to distinguish by means of the data files in the database between different sets of data streams. In this preferred embodiment the structure, content and nature of the relationship between files is established for the viewing software by data files transmitted as a part of the data stream.

The receiving computer 48 is equipped with a graphic user interface that permits the user to interact with the computer using full screen icons and pictures, typically controlling the computer activities with pointing devices such as computer mice.

Having therefore improved the state of the art by providing an improved mass data communication system particularly adaptable to the electronic distribution of newspapers for viewing with a subscriber's personal computer, distribution costs are lowered and made more timely and significant reductions in waste of newsprint is achieved. Therefore the following claims embody those novel contributions identifying the spirit and nature of the invention.

We claim:

1. An electronic distribution system for mass distribution of media copy to readers, comprising in combination, means for organizing the media copy into an electronic data stream formatted in a set of computer files each file comprising media copy with accompanying control identification tags, radio transmission means for transmission of the data stream to a set of end user receivers for viewing directly with corresponding personal computers at corresponding reading stations, radio reception means at the reading stations for receiving the electronic data stream, personal computer means at subscriber stations responsive to the control identification tags in a received data stream for extracting and storing computer files from the data stream, and viewing means at the reading stations for viewing of the media copy selected from stored computer files.

2. The distribution system of claim 1 wherein the means for organizing the media copy, further comprises:

means located at the subscriber stations for processing the respective computer files in response to the identification tags for automatically formatting and processing the computer files at the subscriber stations personal computer.

3. The distribution system of claim 2 wherein the computer further comprises:

control identification tag means for processing in response to identification tag data discriminate extraction of specified data blocks from the data stream at the reading stations for viewing in a predetermined format identified by said identification tag.

4. The distribution system of claim 1 wherein the radio transmission means further comprises means for maintaining a data stream format into which the media copy data is organized newspaper media copy in a sequence of files in a format and code for transfer through a transmission path between said source and reader computers, said format and code comprising a sequence of computer compatible files processable under control of the control software tags for direct storage and formatting of transmittal data in computers at the reader stations.

5. The distribution system of claim 4 further comprising transmitted identification tag instructions in the data stream for identifying and modifying the sequence relationship of the files.

6. The distribution system of claim 4 further comprising transmitted identification tags for the respective sequential ones of said files comprising a transmitted timestamp.

7. The distribution system of claim 1 wherein the radio transmission means further comprises;

a local frequency modulation radio transmission station having an assigned transmission frequency, and means for transmission of said data stream to subscriber stations on a subcarrier frequency of the assigned transmission frequency.

8. The distribution system of claim 1 wherein the viewing means further comprises a personal computer operated printer controlled by said transmitted identification tags to print out at least part of a newspaper in newspaper format.

9. The distribution system of claim 1 wherein the viewing means further comprises a personal computer with graphic user interface and a programmed operating system for exhibiting video copy.

10. The distribution system of claim 1 wherein said system is a newspaper distribution system, said media copy comprises a newspaper and said radio reception means further comprises:

computer processing means for organizing said copy in a format for viewing as a newspaper on a computer screen.

11. The distribution system of claim 1 wherein the transmission means further comprises a one-way transmission from a computer at a newspaper media source over a radio station for reception at a set of subscriber's computers.

12. A distribution system for newspapers, comprising in combination:

means for converting newspaper media copy into a coded electronic data flow stream formatted in a computer compatible file format comprising a series of sequential blocks of copy with accompanying identifying control tag indicia for control in a receiving computer of the storage and presentation of said compatible files in newspaper print format, a radio transmitter equipped for reception and broadcasting of the coded data flow stream in said computer compatible file format for direct processing at reading stations by personal computers, and a set of reading stations within the broadcasting range of the radio transmitter having a radio receiver for receiving the flow stream inputting the flow stream into personal computers for storing and processing said blocks of copy, means for storing selected portions of said blocks of copy in the respective computers of the individual subscribers responsive to said control tag indicia, and viewer operable means for converting the stored portions of the data flow stream into visible newspaper formatted copy for viewing.

13. The method of distributing newspaper media copy to subscribers comprising the steps of:

broadcasting a media flow stream from a newspaper media source, said flow stream comprising a sequence of coded files containing said media copy and corresponding control tag indicia coded in a personal computer compatible file format for direct processing by personal computer systems of a set of subscribers coupled for receiving and responding to the media and control tag indicia by organizing and visually presenting portions of a newspaper selected by a subscriber, and interactively reproducing the selected newspaper portions visually in newspaper copy format at subscriber's personal computer systems.

14. The method of claim 13 further comprising the steps of selecting and manipulating the computer compatible files from the media flow stream at the subscriber's personal computer systems in response to control tag instructions to selectively extract and store those files in newspaper copy format.

15. The method of claim 13 further comprising the steps of:

identifying the computer files in the flow stream with identification control tag indicia representing the creation date and time of creation at the source, and the content, nature, structure, format and sequence relationship of the media copy in the computer files.

16. The method of claim 15 further comprising the steps of:

setting the subscriber's computer system to the creation date and time at the source, and matching the creation date and time of a selected computer file received in the media flow stream on the subscriber's computer system with the creation date and time of the conversion of the media copy being broadcast.

17. The method of claim 15 further comprising the steps of:

receiving and storing at the subscriber's computer system multiple data streams with sequential files, and avoiding interference between data streams by operation of control tag indicia for sequentially numbering the computer files in the flow stream.

18. The method of claim 15 further comprising the steps of:

retransmission of newspaper copy in the media flow stream from time to time, detecting errors occurring in the transmission of the data flow stream by comparison of the identification control tag indicia with the structure of the received computer files, and correcting errors by discarding data files containing errors and passively awaiting to replace data files containing errors upon retransmission.

19. The method of claim 13 further comprising the step of producing a control tag indicia code in the flow stream to control the sequence of transmission and reception of the computer data files.

20. The method of claim 13 further comprising the steps of repeating transmission cycles of predetermined newspaper media copy, sequentially numbering the computer compatible files in each repeated data stream, and extracting and storing any missing sequential computer files from the repeated transmission cycles at the subscriber's computer systems.

21. The method of claim 20 further comprising the step of processing in said repeated transmission cycles a plurality of separately timed data streams containing sequentially numbered files at the subscriber's computer systems.

22. The method of claim 13 further comprising the step of providing spaced pauses in the transmission of the flow stream thereby to match the data handling speed capability of the subscriber's computer system.

23. The method of claim 13 further comprising the steps of:

embedding in the flow stream synchronization and separation codes, and synchronizing the subscriber's computer system with the synchronization and separation codes received in the flow stream.

24. The method of claim 13 further comprising the steps of:

employing a graphic user interface in the subscriber's computer system, and filing computer files extracted from the flow stream by processing with the graphic user interface for viewing and printing as at least a portion of a newspaper in newspaper format in response to said control tag indicia.

25. The method of claim 13 further comprising the steps of:

transmitting in the data stream newspaper text organized in a newspaper format, and visually reproducing the newspaper text in the newspaper format in response to indicia carried by said transmitted control tag indicia at the subscriber's computer system.

* * * * *